United States Patent
Passauer et al.

(10) Patent No.: US 9,528,046 B2
(45) Date of Patent: Dec. 27, 2016

(54) SUBSTRATE FOR SOIL IMPROVEMENT HAVING A WATER-STORING PROPERTY, METHOD FOR PRODUCING SAME, AND USE THEREOF

(71) Applicant: Technische Universität Dresden, Dresden (DE)

(72) Inventors: Lars Passauer, Dresden (DE); Falk Liebner, Braunsdorf (DE); Klaus Fischer, Kurort Hartha (DE); Joachim Katzur

(73) Assignee: Technische Universität Dresden, Dresden (DE)

( * ) Notice: Subject to any disclaimer, the term of this patent is extended or adjusted under 35 U.S.C. 154(b) by 0 days.

(21) Appl. No.: 14/596,261

(22) Filed: Jan. 14, 2015

(65) Prior Publication Data

US 2015/0175882 A1 Jun. 25, 2015

Related U.S. Application Data

(62) Division of application No. 13/578,321, filed as application No. PCT/DE2011/000152 on Feb. 10, 2011, now Pat. No. 8,993,735.

(30) Foreign Application Priority Data

Feb. 10, 2010 (DE) .......................... 10 2010 008 393

(51) Int. Cl.
*C08H 1/00* (2006.01)
*C09K 17/32* (2006.01)
*C08H 7/00* (2011.01)
*C09K 17/16* (2006.01)

(52) U.S. Cl.
CPC .............. *C09K 17/32* (2013.01); *C08H 6/00* (2013.01); *C09K 17/16* (2013.01)

(58) Field of Classification Search
CPC .................................................... C08H 6/00
See application file for complete search history.

(56) References Cited

U.S. PATENT DOCUMENTS

| | | | | |
|---|---|---|---|---|
| 3,149,085 A * | 9/1964 | Ball | ........................ | C08L 63/00 428/413 |
| 3,857,830 A * | 12/1974 | Briggs | ................... | C02F 1/5263 210/730 |
| 3,935,101 A * | 1/1976 | Briggs | ...................... | C02F 1/54 210/730 |
| 4,111,928 A * | 9/1978 | Holsopple | .............. | C08G 59/02 530/507 |
| 4,168,371 A * | 9/1979 | Brown | ................... | B01D 15/34 210/656 |
| 4,184,845 A * | 1/1980 | Lin | .......................... | C08H 6/00 530/500 |
| 4,215,212 A * | 7/1980 | Franks | ..................... | A61L 15/28 106/123.12 |
| 4,221,708 A * | 9/1980 | Lin | .......................... | C08H 6/00 530/501 |
| 4,244,728 A * | 1/1981 | DelliColli | ................ | C08H 6/00 504/188 |
| 4,546,173 A * | 10/1985 | Dilling | ................... | C08L 97/005 530/501 |
| 4,578,456 A * | 3/1986 | Pober | ....................... | C09K 8/90 208/44 |
| 4,611,659 A * | 9/1986 | DeBons | .................. | C09K 8/584 166/270.1 |
| 4,789,523 A * | 12/1988 | Schilling | ................ | C02F 1/5263 252/391 |
| 4,790,382 A * | 12/1988 | Morrow | ............... | B01F 17/0028 166/270.1 |
| 4,918,167 A * | 4/1990 | Glasser | ..................... | C08H 6/00 530/502 |
| 5,102,991 A * | 4/1992 | Glasser | ..................... | C08H 6/00 530/500 |
| 5,102,992 A * | 4/1992 | Glasser | ..................... | C08H 6/00 527/400 |
| 5,121,801 A * | 6/1992 | Meister | ................... | B01D 71/78 166/268 |
| 5,192,361 A * | 3/1993 | Schilling | ................ | C09D 11/14 106/123.13 |
| 5,338,404 A * | 8/1994 | Lucas | .................... | D21H 19/14 162/162 |
| 5,382,608 A * | 1/1995 | Gardzielia | ............ | C08L 97/005 524/14 |
| 5,424,382 A * | 6/1995 | Meister | .................... | C08H 6/00 435/911 |
| 5,608,040 A * | 3/1997 | Huttermann | ............. | C08H 6/00 435/100 |
| 5,720,792 A * | 2/1998 | Fischer | ................... | C05C 11/00 71/11 |
| 6,214,976 B1 * | 4/2001 | Watanabe | ................ | C08H 6/00 530/500 |
| 6,291,558 B1 * | 9/2001 | Raskin | ..................... | C07G 1/00 524/13 |

(Continued)

OTHER PUBLICATIONS

Lanzalunga et al. (Journal of Photochemistry and Photobiology B: Biology, 56, 2000, 85-108).*
Nishida et al. (ISWPC vol. II, 43-46, 2001).*

*Primary Examiner* — Liam J Heincer
(74) *Attorney, Agent, or Firm* — Gudrun E. Huckett

(57) ABSTRACT

In a method for producing a substrate for soil improvement with water-storing property on the basis of lignin, lignin is provided and oxidized alternatively in an aqueous alkaline or a pH-neutral aqueous suspension, wherein the pH-neutral aqueous suspension after oxidation of the lignin is converted into an alkaline medium. The lignin is cross-linked in an aqueous alkaline medium by multi-functional compounds. Subsequently, the lignin is neutralized, dried, and comminuted. The produced lignin is used as a substrate for improvement of soil properties in that the substrate is used as a water storage that, compared to water storages of non-modified technical lignins, exhibits a significantly higher water adsorption capacity or swelling capacity.

5 Claims, 3 Drawing Sheets

(56) References Cited

U.S. PATENT DOCUMENTS

| | | | |
|---|---|---|---|
| 6,339,116 B1* | 1/2002 | Afzali-Ardakani | C08H 6/00 523/447 |
| 6,593,460 B1* | 7/2003 | Huttermann | C08H 6/00 524/76 |
| 8,377,853 B2* | 2/2013 | Ballard | C09K 8/203 166/285 |
| 2001/0051281 A1* | 12/2001 | Owens | C08G 73/02 428/537.5 |
| 2002/0065400 A1* | 5/2002 | Raskin | C07G 1/00 530/500 |
| 2002/0197406 A1* | 12/2002 | Owens | C08G 73/02 427/331 |
| 2004/0224853 A1* | 11/2004 | Jasinski | C09K 8/203 507/140 |
| 2007/0249504 A1* | 10/2007 | Ballard | C09K 8/203 507/207 |
| 2008/0217013 A1* | 9/2008 | Stokes | C07C 29/76 166/300 |
| 2011/0274612 A1* | 11/2011 | Wohlmann | C08G 18/6492 423/447.2 |
| 2012/0012035 A1* | 1/2012 | Blank | C04B 24/18 106/802 |
| 2014/0249300 A1* | 9/2014 | Bozell | C07G 1/00 530/507 |
| 2015/0344737 A1* | 12/2015 | Bode | C08H 6/00 428/35.7 |

* cited by examiner

Fig. 3

|  | Indulin AT | Indulin ox. |
| --- | --- | --- |
| emp. C9 Formula | $C_9$ $H_{6.6}$ $O_{0.7}$ $S_{0.1}$ $(OCH_3)_{0.8}$ $(OH_{phen})_{0.7}$ $(OH_{aliph})_{0.7}$ $(O_{CO})_{0.1}$ $(OOH_{COOH})_{0.2}$ | $C_9$ $H_{6.9}$ $O_{1.2}$ $S_{0.1}$ $(OCH_3)_{0.8}$ $(OH_{phen})_{1.0}$ $(OH_{aliph})_{0.8}$ $(O_{CO})_{0.3}$ $(OOH_{COOH})_{0.3}$ |

Table 1: Empirical C9 Formulas

Fig. 4

|  | Non oxidized | $H_2O_2$-RT | $H_2O_2$-80°C | $H_2O_2$-Fe(II) | $H_2O_2$-Mn(II) |
| --- | --- | --- | --- | --- | --- |
| Indulin AT | 8.0 | - | 9.2* | 48.5* | 35.2* |
| Organocell Lignin | 27.9 | 72.5* | 7.5 | 12.2 | - |

*Improvement of the swelling performance of lignin gels by oxidative pre-treatment of the starting lignin Table 2: FSC Values of Select Lignin Hydrogels

Fig. 5

| Crosslinker quantity mmol/g Indulin ox.* | 0.21 | 0.27 | 0.32 | 0.38 |
| --- | --- | --- | --- | --- |
| FSC (g/g) | 48.5 | 27.2 | 22.7 | 20.5 |

*Indulin AT oxidized with hydrogen peroxide/iron(II) chloride tetrahydrate

Table 3: FSC Values of Indulin

SUBSTRATE FOR SOIL IMPROVEMENT HAVING A WATER-STORING PROPERTY, METHOD FOR PRODUCING SAME, AND USE THEREOF

CROSS-REFERENCE TO RELATED APPLICATIONS

This application is a divisional application of U.S. application for patent Ser. No. 13/578,321 having a date of completion of all 35 U.S.C. 371 requirements of 4 Sep. 2012, said application being a national stage filing of international application No. PCT/DE2011/000152 having an international filing date of 10 Feb. 2011 and designating the United States, said international application claiming a priority date of 10 Feb. 2010, based on prior filed German patent application No. 10 2010 008 393.3, the entire contents of the aforesaid United States application for patent, the aforesaid international application, and the aforesaid German patent application being incorporated herein by reference.

BACKGROUND OF THE INVENTION

The invention relates to a substrate for soil improvement that has a water-storing property, a method for producing the substrate, and use of the substrate.

As soil improvers on the basis of natural products, for example, graft copolymers of starch are used that, however, are decomposed over the course of time of a few weeks. For the use as a soil water storage, it is important that the latter is not too quickly decomposed. Lignin is a biopolymer which, in comparison to polysaccharides such as starch or cellulose, is more stable with respect to microbial decomposition.

DE 198 28 483 A1 discloses a product as a soil improver or for improvement of plant growth medium that contains a lignin sulfonate gel as an important component. This product is said to bind water and ionic nutrient materials. For producing the lignin sulfonate gel of lignin sulfonates, reference is being had, inter alia, to the generally known crosslinking with formaldehyde (e.g., U.S. Pat. No. 3,864,276 and U.S. Pat. No. 4,332,589). The generally known crosslinking reaction is performed in the cited publications for crosslinking of the inherently water-soluble lignin sulfonates.

The product that is disclosed in DE 198 28 483 A1 is said to have a capacity of binding water; however, this type of crosslinking of lignin sulfonates, as is well-known, leads to sluggishly reacting gels that are swellable only modestly. The water absorption capacity of the lignin sulfonate gels is not specified in more detail.

DE 27 03 812 A1 discloses a crosslinked lignin gel and a method for producing crosslinked lignin gels that are used as controlled-release carriers for different pesticides. For producing the gel, preferably alkaline lignin is crosslinked with formaldehyde, glutar aldehyde or epichlorohydrin. When doing so, gels are formed that absorb water in an amount of 3 to 11 times their own weight.

The publication DE 27 03 812 A1 discloses that the aldehyde-crosslinked gel has a small dry surface area and an almost non-existing water-free pore structure. Accordingly, the gel is suitable for controlled release of pesticides but is entirely unsuitable as a water storage in the soil.

DE 26 23 663 A1 discloses a pesticide mass with gel carrier and a method for its preparation. This invention concerns an improved carrier on the basis of lignin for controlled release of organic water-insoluble pesticides. Crosslinking of lignin is realized by means of epichlorohydrin. As in DE 27 03 812 A1, the product, because of its minimal porosity of only 1.8 $m^2/g$, is unsuitable as a water storage. Crosslinking of alkaline lignin with epichlorohydrin is disclosed also in U.S. Pat. No. 4,131,573.

Crosslinking of lignin with diepoxides, however for producing flocculant agents, is disclosed in U.S. Pat. No. 3,857,830. Here, crosslinking of lignin is carried out with diepoxides in aqueous alkaline medium and organic solvents wherein water-insoluble epoxides are reacted in water-insoluble organic solvents. As crosslinking agents, C-linked diepoxides, diglycidyl ethers, and diglycidyl amines are used.

The use of bifunctional epoxides, especially of poly (ethylene glycol) diglycidyl ether, for producing hydrogels based on lignin is disclosed in M. Nishida, Y. Uraki, Y. Sano, Proc. ISWPC Vol II, 43-46, 2001, and M. Nishida, Y. Uraki, Y. Sano, Bioresource Technol. 2003, 88, 81-83. Here, lignins obtained by acid hydrolysis were used and their swelling behavior examined in aqueous organic solvents. The swelling capacity of the gels was comparatively minimal. H. Yamamoto, M. Amaike, H. Saitoh, Y. Sano, Mat. Sci. Eng. C7 2000, 143-147, disclose the preparation of hydrogels from a mixture of Kraft lignin, phenol and formaldehyde. The water absorption capacity of these gels was minimal and was not the focus of consideration. A further possibility for synthesis of lignin hydrogels resides in copolymerization between acrylamide and polyvinyl alcohol with lignin (W. K. El-Zawawy, Polym. Adv. Technol. 2005, 16, 48-54). The water absorption capacity of the described gels is less than 10 g water per g of dried gel substance.

The object of the invention resides in that a substrate on the basis of lignin for soil improvement having a water-storing property, a method for producing, and its use are to be provided, which substrate binds the stored water over a longer period of time and releases it, as needed, into the soil wherein the lignin basis should not react sluggishly and be swellable.

SUMMARY OF THE INVENTION

According to the invention, the object is solved by a method for producing a substrate for soil improvement with water-storing property on the basis of lignin, characterized by the steps providing lignin, oxidation of lignin alternatively in an aqueous alkaline or a pH-neutral aqueous suspension wherein the pH-neutral aqueous suspension after oxidation of the lignin is converted into an alkaline medium, crosslinking of the lignin in an aqueous alkaline medium by use of multi-functional compounds, neutralizing, drying, and comminuting the lignin.

Advantageous variants of the method are the subject matter of dependent claims.

The object is solved furthermore by a substrate for soil improvement with water-storing property comprised of lignin, characterized in that the lignin is modified at the aromatic structures as well as at the aliphatic structures by introduction of oxygen-functional groups and is crosslinked by bifunctional crosslinking substances at the aliphatic and phenolic hydroxy groups introduced by oxidation.

The object is further solved by the use of the substrate, produced according to the method of the invention, for improvement of the soil properties, characterized in that the substrate is used as a water storage that, compared to water storages of non-modified technical lignins, exhibits a significantly higher water adsorption capacity or swelling capacity.

Subject matter of the invention are absorbers or hydrogels that are produced by crosslinking of lignins with multi-functional crosslinker substances, especially diglycidyl ethers. Crosslinking is preceded by a pretreatment of the lignin in the meaning of oxidation. The special property of the produced product resides in a significantly increased swelling performance relative to gels that are produced from non-modified technical lignins. The native origin of the lignin as a starting material has the effect that the product is innocuous and environmentally safe.

The product is capable of absorbing a multiple of its own weight in water, i.e. to swell. The materials have no tendency to undergo gel blocking, gumming of the outer layers of the material upon contact with water which prevents further penetration of water. As a result of the granular form of the material in the dried state, the absorbers separate upon swelling into individual particles, therefore they do not form a "gel block". They have different gel stabilities that can be adjusted individually by variation of the crosslinking degree or use of different spacers. This is also important inasmuch as the water absorption capacity and the stability of chemical networks represent contrary parameters but, by means of the degree of crosslinking, the desired combination thereof is achieved.

As starting materials different technical lignins can be used, such as alkaline lignin (e.g. Indulin™ AT), organosolv lignin (e.g. Organocell lignin) but also so-called hydrolysis lignins e.g. from annual plants (e.g. sugarcane) such as Sucrolin™ (bagasse lignin). As crosslinking substances multi-functional compounds, preferably bifunctional epoxides, especially diglycidyl ethers, are used.

The oxidation of lignin is carried out in aqueous alkaline solution or aqueous pH-neutral suspension; the subsequent crosslinking in aqueous alkaline medium. The preparation time or reaction time during oxidation of lignin is 12-24 hours, the crosslinking duration is a few hours (approximately 3-8 hours, depending on the reacted material quantity and employed lignin).

The oxidation of lignin is carried out advantageously with hydrogen peroxide or the systems hydrogen peroxide/iron (II) (Fenton system) or hydrogen peroxide/manganese(II).

The Fenton system is used inter alia already for hydroxylation of aromatic structures. Reference is being had to DE 689 03 601 and DE 689 00 265 T2 in which the hydroxylation of aromatic hydrocarbons with hydrogen peroxide/iron sulfate is disclosed. DE 26 58 943 discloses the manufacture of aromatic dihydroxy compounds such as catechols and hydroquinones. According to DE 25 58 545 a nucleus hydroxylation can also be realized by means of oxidation with hydrogen peroxide in combination with different acids.

The structural changes that are caused by oxidation, such as introduction of oxygen-functional groups and cleavage of the lignin macromolecule, effect an increase of the reactivity and hydrophilic property of the lignin and thus its significantly improved crosslinkability and a water storage capacity of the resulting gels that is increased up to eight times in comparison to products that are produced by crosslinking of non-modified technical lignins with diglycidyl ethers according to M. Nishida et al., Proc. ISWPC 2001 Vol II, 43-46, and M. Nishida et al., Bioresource Technol. 2003, 88, 81-83, and L. Passauer, Master's Thesis, T U Dresden, 2004. The oxidative pretreatment of the lignin is realized by means of two alternative methods:

1.) The lignin is dissolved in the sodium hydroxide solution and is stirred for several hours. Subsequently, aqueous hydrogen peroxide solution with a defined concentration is added. The mixture is again stirred for several hours and subsequently the crosslinker is slowly added dropwise. The product is subsequently washed with diluted hydrochloric acid up to the point of neutralization, is dried and then comminuted.

2.) The lignin is suspended first in water and stirred briefly. Subsequently, an iron(II) salt or a manganese(II) salt is added. In order to ensure a distribution as uniformly as possible of the $Fe^{2+}$ or $Mn^{2+}$ ions in the suspension (hydrophobic character of the employed lignins) stirring is continued for a few hours. Subsequently, an aqueous hydrogen peroxide solution of a defined concentration is added and the suspension is stirred for several hours.

In order to achieve crosslinking of the pre-oxidized lignin, it is necessary to dissolve it completely. For this purpose, alkali is added to the suspension with the pre-oxidized lignin and stirring is continued for another 12-24 hours. The solution is then dried under an exhaust hood until it is barely still stirrable and subsequently the crosslinking substance is slowly added dropwise. As a crosslinker, bifunctional epoxides are used, preferably diglycidyl ethers. The mixture is stirred until, as a result of a drastic viscosity increase caused by crosslinking, stirring is no longer possible. The product is subsequently washed with diluted sulfuric acid to the point of neutralization, dried and comminuted. The swelling values have been increased by oxidative pretreatment up to 800%.

The reaction of the pre-oxidized lignin in alkaline medium is carried out for the reason of dissolving it completely (conversion of phenolic structures of the lignin in soluble phenolates) and effects at the same time the alkaline-catalyzed ring opening reaction of the epoxy group of the diglycidyl ether and enables thus the subsequent etherification with the lignin.

BRIEF DESCRIPTION OF THE DRAWINGS

FIG. 3 shows Table 1 that lists C9 formulas of Indulin AT and Indulin oxidized with hydrogen peroxide/iron(II), determined by means of elemental analysis and determination of oxygen-functional groups.

FIG. 4 shows Table 2 that provides an overview of the FSC values of select lignin hydrogels that have been produced on the basis of non-modified (non-oxidized) and oxidatively pretreated technical lignins.

FIG. 5 shows Table 3 that shows FSC values of indulin gels with variation of the quantity of poly(ethylene glycol) diglycidyl ether.

DESCRIPTION OF PREFERRED EMBODIMENTS

Figure 1:
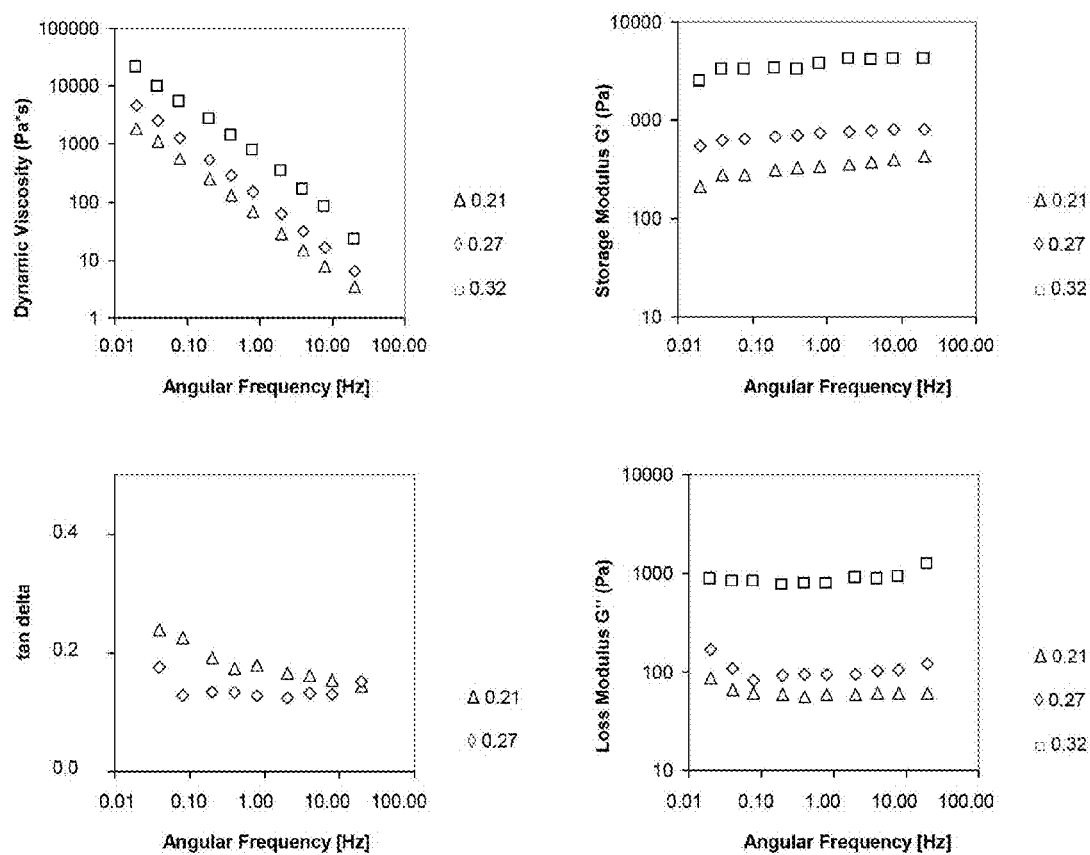
FIG. 1 shows the course of the rheologic parameters characterizing the gel, dynamic viscosity $\eta^*$, storage modulus $G'$, and loss module $G''$ as well as the loss factor $\tan \delta$, plotted against the angular frequency $\omega$.

The invention will be explained in the following in more detail.

Starting Materials

As starting materials, the following technical lignins were employed:
Indulin™ AT (MeadWestvaco, Charleston, USA)
Sucrolin® (C.G. Smith Chemicals, Durban, South Africa)
Organocell lignin (formerly Organocell GmbH München, pilot plant München-Pasing).

Indulin is an alkaline lignin (Kraft lignin of pine) that is obtained as a byproduct of alkaline pulping. Sucrolin originates from a facility for production of furfural and is obtained by autohydrolysis of sugarcane bagasse. Organocell lignin is organosolv lignin of fir.

As catalysts, inter alia the following can be used:
iron(II) chloride tetrahydrate $FeCl_2*4H_2O$
manganese(II) chloride tetrahydrate $MnCl_2*4H_2O$
or other Fe(II) or Mn(II) salts.

As crosslinking substance, advantageously poly (ethylene glycol) diglycidyl ether (with the following structural formula I) is used, preferably with an average number of 9 ethylene oxide groups and an average molecular weight Ø MG of 526 (Sigma-Aldrich)

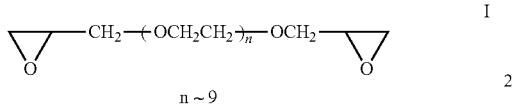

n ~ 9

Oxidation Reaction Conditions

The oxidation of lignin is realized with hydrogen peroxide in an alkaline medium (1) or a mixture of hydrogen peroxide with manganese(II) salt or iron(II) salt at neutral pH conditions (2).

1.) The lignin was dissolved in 1 to 3.5 molar sodium hydroxide solution, preferably 3.3 molar sodium hydroxide solution, and stirred for a period of time of 24 hours. The pH value of the solution was adjusted to 12-13, the solids content of the alkaline solution, as a function of the employed lignin, to 25-40% (w/v). When using Indulin, the solids content should be adjusted to preferably 25-33% (w/v), when using Sucrolin to 36%, and when using Organocell lignin to 39%. Subsequently, a defined quantity of 5% aqueous hydrogen peroxide solution was slowly added dropwise. The hydrogen peroxide concentration in the alkaline lignin solution was, as a function of the employed lignin 0.26-0.56%, in the Indulin solution preferably 0.45% (v/v), in the Sucrolin solution preferably 0.31%, and 0.45% when using Organocell lignin. This solution was stirred for 12-24 hours, preferably 24 hours, at RT. When carrying out oxidation with heating, the reaction time was shortened. Preferably, stirring then was done for 3 hours at 80° C.

2.) The lignin was first suspended in water. The preferred solids content of the lignin suspension was 25 to 33% (w/v), preferably 33% (w/v) when using Indulin and Organocell lignin, and 25% when using Sucrolin. After a sufficient homogenization of the aqueous suspension, stirring should be carried out here for at least 30 minutes, the catalyst was added. The employed quantities of Fe(II) salts were 0.025 to 0.5 mmol, preferably 0.05 to 0.15 mmol, relative to 1 g of lignin. When using Mn(II) salts, the employed quantities were 0.013-0.13 mmol relative to 1 g of lignin. Subsequently, aqueous hydrogen peroxide solution, preferably 5% (v/v), was added dropwise so that the hydrogen peroxide concentration of the suspension was adjusted to 0.3-0.75%, preferably 0.5% (w/v). The optimal concentrations of hydrogen peroxide, when using Indulin and Organocell lignin, were 0.45% (w/v) and, when using Sucrolin, 0.31% (w/v). The lignin suspensions were stirred after addition of aqueous hydrogen peroxide solution for 12-24 hours, preferably 24 hours. After completion of oxidation 3.3 molar sodium hydroxide solution was added to the suspension and, in doing so, the proportion of lignin was reduced to 20% by weight. The pH value of the resulting solution was approximately 12.

The structural changes caused by oxidation are represented with the aid of the empirical C9 formula of lignin. It represents the average composition of the basic module of lignin, the phenyl propane unit. As an example, the most frequent phenyl propane units of lignin are represented (structure II: p-cumaryl alcohol; structure III: coniferyl alcohol; structure IV: sinapyl alcohol).

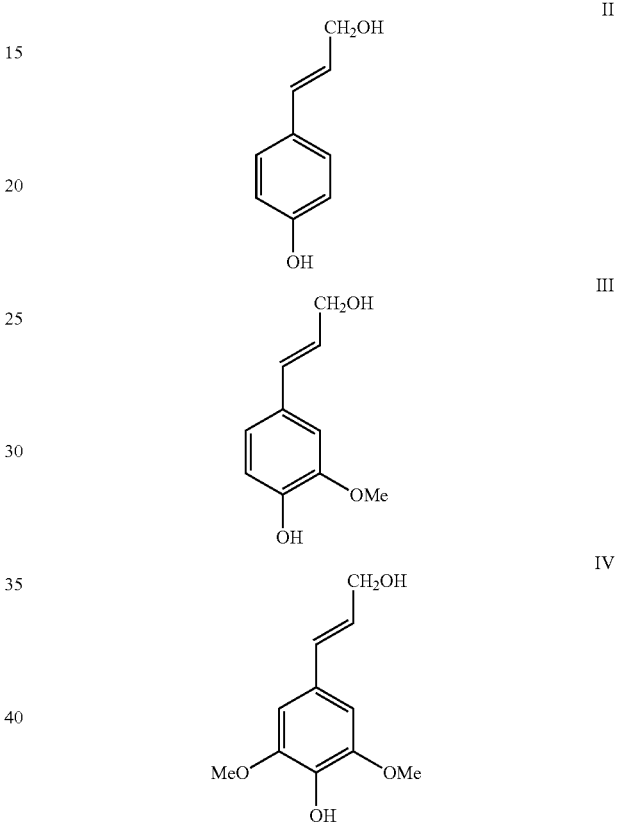

The C9 formulas of Indulin AT and Indulin oxidized with hydrogen peroxide/iron(II), determined by means of elemental analysis and determination of oxygen-functional groups, are represented in Table 1.

Crosslinking Reaction Conditions

The gel properties, in particular the water absorption capacity (FSC, free swelling capacity) but also the gel stability can be varied across relatively wide ranges by the degree of crosslinking but also by use of various spacers. Depending on the desired degree of crosslinking and as a function of employed lignin and its modification by means of oxidation, 0.15 to 0.5 mmol crosslinking agent, relative to 1 g of lignin, was required for carrying out the reaction. As crosslinkers, diglycidyl ethers, preferably poly (ethylene glycol) diglycidyl ether, were used. For crosslinking lignins that have been modified by means of hydrogen peroxide in alkaline medium, crosslinking quantities of 0.3 to 0.5 mmol, preferably 0.5 mmol, were used. The crosslinking substance was slowly added dropwise immediately after oxidative modification of the lignin into the alkaline lignin solution and the substance mixture was stirred up to the point of a drastic viscosity increase (crosslinking and gel formation), depending on the employed lignin and crosslinking substance quantity, 3-12 hours. For crosslinking lignins that have been modified by means of hydrogen peroxide/iron(II), gel formation was observed upon use of crosslinker quantities of 0.20 to 0.40 mmol of poly (ethylene glycol) diglycidyl ether when using alkaline lignin Indulin; preferably 0.5 mmol of poly (ethylene glycol) diglycidyl ether were required when using Organocell lignin and Sucrolin. Here also the crosslinking substance was slowly added dropwise to the alkaline lignin solution. The substance mixture was stirred until crosslinking occurred, manifested by a strong viscosity increase of the solution. The mechanism of the crosslinked reaction is illustrated in the following.

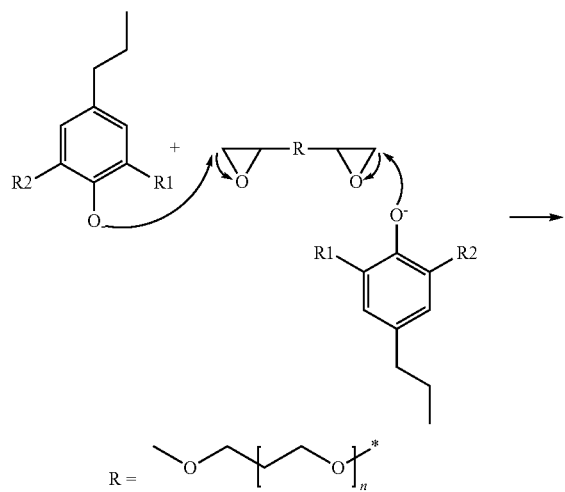

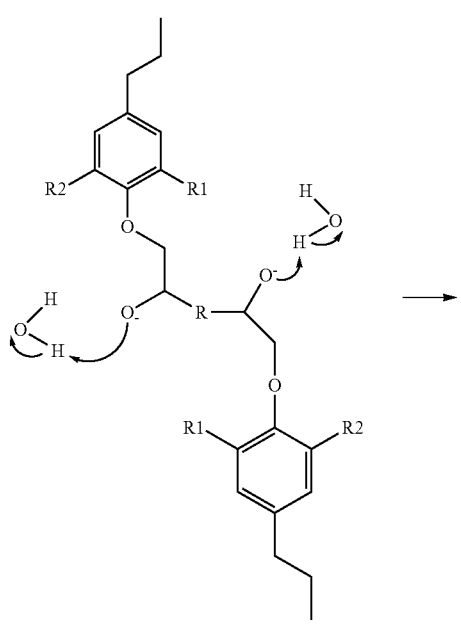

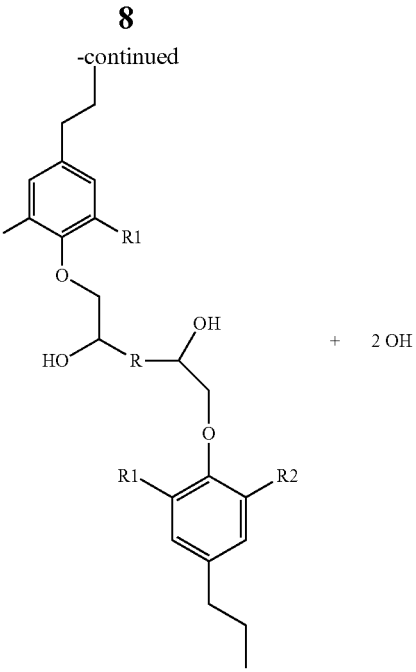

-continued

After crosslinking, the gels were neutralized with diluted hydrochloric acid and washed with deionized water in order to remove salts and unreacted material. After drying of the washed gel at 105° C., a granular material (xerogel) that can be ground is obtained.

By means of the crosslinker quantity, the gel properties such as swelling behavior, gel strength or gel stability (rheologic parameters) and the behavior of the gels upon their use in the soil, for example, water retention, can be varied in a targeted fashion. In the following, the testing methods required for this are described with which select physical gel properties can be determined.

Test Methods

Swelling Behavior: FSC (Free Swelling Capacity)

For determining the water absorption capacity or swelling capacity of hydrogels, 0.5 g of the product to be tested (dry gel) are weighed into a G3 frit. The material contained in the frit is then wetted for an hour with water. Subsequently, the frit is allowed to drip off for 10 minutes and its weight is determined. In this way, the FSC value can be determined as follows.

$$FSC = \frac{g(H_2O)}{g(product)} = \frac{outputweight\,(frit) - blankvalue\,(frit)}{inputweight}$$

Table 2 provides an overview of the FSC values of select lignin hydrogels that have been produced on the basis of non-modified (non-oxidized) and oxidatively pretreated technical lignins. A significant increase of the FSC values by oxidative pretreatment of lignin can be deduced.

By variation of the crosslinker quantity, the FSC values of the resulting gels can be adjusted in a targeted fashion. One example is given in Table 3.

Rheologic Parameters

Dynamic Viscosity $\eta^*$, Storage Modulus $G'$, Loss Modulus $G''$, Loss Factor $\tan\delta$ With respect to the possibilities of use of hydrogels, their rheologic properties and the resulting material stability are of great interest. The method of choice for corresponding characterization of chemical networks is the oscillation measurement in which the sample is subjected to a sinus-shaped deformation γ with small amplitude and an angular frequency ω.

The rheologic parameters of the lignin hydrogels were determined by means of oscillation rheometer BOHLIN by variation of the oscillation frequency (frequency sweep) under the following measuring conditions: cone plate system, cone diameter 40 mm, angle 4°, temperature 20° C., frequency 0.02-20 Hz, shearing stress 0.2 to 1.0 Pa.

When using oscillation measurements, for a sufficiently small amplitude of the deformation the determined values are within the so-called linear viscoelastic range (KULICKE, 1986) which has the advantage that the measurements are carried out without destruction. At the same time several parameters are determined: dynamic viscosity η, gel strength or storage modulus G' (material elasticity), loss modulus G" (material viscosity), and the loss factor tan δ with δ=G"/G'. For tan δ<1, the gel is elastic; for tan δ>1, the viscous properties dominate.

The illustrations of FIG. 1 show the course of the parameter dynamic viscosity η*, storage modulus G', loss modulus G", and loss factor tan δ as a function of the angular frequency ω for gels on the basis of Indulin AT, oxidized with hydrogen peroxide/iron(II) that has been crosslinked with different quantities of poly (ethylene glycol) diglycidyl ether (0.21; 0.27 and 0.32 mmol/g of Indulin). Viscosity and material stability or gel strength increase with the crosslinker quantity.

Water Retention

A decisive feature of hydrogels is their water retention capacity or water retention. When using hydrogels as soil water storage, the water retention curve of the corresponding soil samples is determined. The measurement of the water retention curve where the water contents (volume %) is plotted against the soil moisture tension (as pF value), was carried out in accordance with DIN 16983. After complete saturation with water, the samples were dewatered stepwise on ceramic plates up to a constant weight. The following dewatering stages were adjusted pF 1.0 (1 kPa); pF 1.5 (3 kPa); pF 1.8 (6 kPa); pF 2.5 (30 kPa); pF 3.0 (100 kPa); and pF 4.2 (160 kPa) etc. At pF values ≤2.0, dewatering of the samples was carried out by means of a suspended water column, at higher pF values in a pressure vessel by overpressure.

Based on the water contents determined at different pressure stages, the parameters field capacity (FK), useful field capacity (nFK) and permanent wilting point (PWP) have been derived. They correspond by definition to the water content of a soil body at pressure stages 1.8 (FK), the difference of the water content at pF 1.8 and pF 4.2 (nFK), and the water content at pF 4.2 (PWP).

Figure 2:
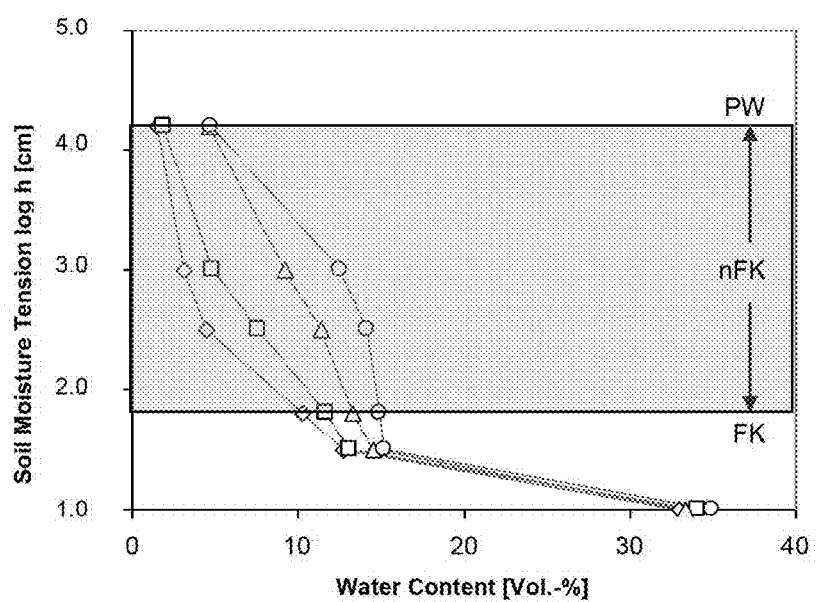
FIG. 2 shows water retention curves of pure sand treated with different quantities of lignin hydrogel.

FIG. 2 shows the water retention curves of pure sand treated with a lignin gel. As a result of the gel application (in the example 0.1; 0.25; and 0.5% by weight of dried gel granules), the retained water quantities in the soil have been increased significantly wherein the retained water quantity increases with the employed gel concentrations. This concerns in particular the proportion of the plant-available adhesive water (pF 2.5-4.2). These effects are based on a gel-caused increase of the fine pore volume and medium pore volume in the soil which corresponds to a decrease of the coarse pore proportion. The effect on the soil structure is realized, on the one hand, by means of swelling of the gel particles, on the other hand, also by adsorptive interactions between gel particles and soil particles that favor an aggregation of soil particles and a structural stabilization in the soil. This counteracts soil erosion in correspondingly endangered regions. Furthermore, an increase of the water retention reduces washing out of nutrients from the soil and, in this way, the nutrient supply of plantings and crops is improved.

Application

The use of the soil water storage is realized in the form of powder or granular material which is introduced in a quantity of 0.1 to 1% by volume, preferably 0.25 to 0.5% by volume, relative to the soil volume.

Embodiments

Oxidation of lignin with hydrogen peroxide in alkaline medium and crosslinking with poly (ethylene glycol) diglycidyl ether (in the following: PEGG)

1. 10 g of Indulin AT are dissolved in 15 ml of 3.3 molar aqueous NaOH and stirred for 24 hours. Subsequently, 1.0 ml of 5% $H_2O_2$ solution is added dropwise and the mixture is stirred for another 24 hours. Subsequently, 1.32 g of PEGG are slowly added dropwise and stirring is continued to the point of gel formation (viscosity increase); subsequently, the alkaline gel is neutralized with diluted hydrochloric acid and washed with deionized water. The product is dried at 105° C. and subsequently ground. With respect to the FSC value of the hydrogel (8 g/g), reference is being had to Table 2.

2. 5 g of Organocell lignin are dissolved in 8 ml of 3.3 molar aqueous NaOH and stirred for 24 hours. Subsequently, 1.0 ml of 5% $H_2O_2$ solution is added and the mixture is stirred for another 24 hours. Subsequently, 1.32 g of PEGG are slowly added dropwise and stirring is continued to the point of gel formation; subsequently, the alkaline gel is neutralized with diluted hydrochloric acid and washed with deionized water. The product is dried at 105° C. and subsequently ground. The FSC value of the produced hydrogel is 27.9 g (Table 3).

3. 5 g of Sucrolin are dissolved in 9 ml of 3.3 molar aqueous NaOH and stirred for 24 hours. Subsequently, 0.5 ml of 5% $H_2O_2$ solution are added and the mixture is stirred for another 24 hours. Subsequently, 1.32 g of PEGG are slowly added dropwise and stirring is continued to the point of gel formation (viscosity increase); subsequently, the alkaline gel is neutralized with diluted hydrochloric acid and washed with deionized water. The product is dried at 105° C. and ground. The hydrogel is distinguished by an FSC value of 8.0 g/g (Table 3).

Oxidation of lignin with hydrogen peroxide/iron(II)/manganese(II) in neutral medium and crosslinking with poly (ethylene glycol) diglycidyl ether (in the following: PEGG).

4. 5 g of Indulin are suspended in 10 ml of $H_2O$ and 0.01 g of $FeCl_2*4H_2O$ is added. The mixture is stirred for 30 minutes and 1 ml of 5% $H_2O_2$ solution is added, followed by stirring for additional 24 hours. Subsequently, 10 ml of 3.3 molar aqueous NaOH are added and the mixture is stirred for another 24 hours. Subsequently, the alkaline solution is condensed to a solids content of 30-35% (exhaust hood, rotary vacuum evaporator) so that it is barely still stirrable. With stirring, 0.55 g of PEGG (corresponds to 0.21 mmol/g lignin) are slowly added dropwise and stirring is continued up to the point of gel formation (viscosity increase). Subsequently, the alkaline gel is neutralized with diluted hydrochloric acid and washed with deionized water. The product is dried at 105° C. and ground to a granular material. With regard to the FSC value (48.5 g/g), reference is being had to Table 2. The Table shows that, in comparison to the gel on the basis of non-modified Indulin, the FSC value has been increased by more than six times. The course of the rheologic parameters characterizing the gel, dynamic viscosity $\eta^*$, storage modulus G', and loss module G" as well as the loss factor tan δ, plotted against the angular frequency ω, is illustrated in FIG. 1 and indicates the gel character and the mechanical stability of the material. With respect to water retention in the soil, reference is being had to FIG. 2. From this it can be seen that in particular with respect to soil moisture tension between field capacity (pF 1.8) and permanent wilting point (pF 4.2) the water content of pure sand by application of the lignin hydrogel can be increased to more than 3 times the value.

5. Like embodiment 4, but using a crosslinker quantity of 0.70 g of PEGG (corresponds to 0.27 mmol/g lignin). With regard to the FSC value (27.2 g/g), reference is being had to Table 3. The course of the rheologic parameters characterizing the gel, dynamic viscosity $\eta^*$, storage modulus G, loss modulus G" as well as loss factor tan δ, are illustrated in FIG. 1.

6. Like embodiment 4, but using a crosslinker quantity of 0.85 g PEGG (0.32 mmol/g lignin). With regard to the FSC value (22.7 g/g), reference is being had to Table 3. The course of the rheologic parameters characterizing the gel, dynamic viscosity $\eta^*$, storage modulus G', and loss modulus G" are illustrated in FIG. 1. From this it can be derived that with the crosslinker quantity the dynamic viscosity $\eta^*$, the elastic proportion G', and thus the mechanical stability of the lignin gel increase significantly.

7. 5 g Indulin are suspended in 10 ml $H_2O$ and 0.01 g of $MnCl_2 \cdot 4H_2O$ are added and the mixture is stirred for 30 minutes. Subsequently, 1 ml of 5% $H_2O_2$ solution is added and the lignin suspension is stirred for another 24 hours. Subsequently, 10 ml of 3.3 molar aqueous NaOH is added and the mixture stirred for another 24 hours. Subsequently, the alkaline solution is condensed to a solids content of 30-35% (exhaust hood, rotary vacuum evaporator) so that it is barely still stirrable. With stirring, 0.55 g of PEGG are slowly added dropwise and stirring is continued up to the point of gel formation (viscosity increase). Subsequently, the alkaline gel is neutralized with diluted hydrochloric acid and washed with deionized water. The product is dried at 105° C. and then ground. With regard to the FSC value (35.2 g/g), reference is being had to Table 2.

What is claimed is:

1. A method for producing a substrate for soil improvement with water-storing property on the basis of lignin, characterized by the steps:
    providing lignin,
    oxidation of lignin alternatively in an aqueous alkaline or a pH-neutral aqueous suspension, wherein the pH-neutral aqueous suspension after oxidation of the lignin is converted into an alkaline medium, wherein the oxidation is carried out with:
    hydrogen peroxide, or
    a Fenton system, the Fenton system comprised of the combination of hydrogen peroxide and an Fe(II) salt, or
    a mixture of hydrogen peroxide and a Mn(II) salt,
    crosslinking of the lignin in an aqueous alkaline medium by use of multi-functional compounds,
    neutralizing, drying, and comminuting the lignin.

2. The method according to claim 1, characterized in that technical lignin such as alkaline lignin, organosolv lignin or hydrolysis lignin is provided.

3. The method according to claim 1, characterized in that for crosslinking of the lignin bi-functional epoxides are used.

4. The method according to claim 1, wherein in the step of comminuting the lignin is comminuted to a grain size of 100 μm to 5 mm.

5. The method according to claim 3, wherein the bi-functional epoxide is poly (ethylene glycol) diglycidyl ether.

* * * * *